(12) United States Patent
Smith et al.

(10) Patent No.: US 6,951,137 B2
(45) Date of Patent: Oct. 4, 2005

(54) METHOD AND APPARATUS FOR MEASURING BENDING IN A PIN MEMBER

(75) Inventors: Douglas E. Smith, North Ogden, UT (US); Peter D. Totman, Ogden, UT (US); Randy L. Everton, Brigham City, UT (US); Paul A. St. Jean, Layton, UT (US); Marvin D. Bunderson, Brigham City, UT (US); Mark R. Eggett, Brigham City, UT (US); Randy L. Borgstrom, South Weber, UT (US)

(73) Assignee: Alliant Techsystems, Inc., Edina, MN (US)

( * ) Notice: Subject to any disclaimer, the term of this patent is extended or adjusted under 35 U.S.C. 154(b) by 0 days.

(21) Appl. No.: 09/897,003

(22) Filed: Jul. 2, 2001

(65) Prior Publication Data

US 2003/0000314 A1 Jan. 2, 2003

(51) Int. Cl.$^7$ ............................ F16B 31/02; G01N 3/20
(52) U.S. Cl. ........................................ 73/761; 73/849
(58) Field of Search .......................... 73/862.451, 849, 73/862.392, 862.621, 862.03, 862.041, 862.044, 862.045, 761

(56) References Cited

U.S. PATENT DOCUMENTS

| | | | | |
|---|---|---|---|---|
| 3,695,096 A | | 10/1972 | Kutsay | |
| 4,429,579 A | * | 2/1984 | Wilhelm | ................ 73/862.629 |
| 4,553,124 A | * | 11/1985 | Malicki | ................ 73/862.629 |
| 4,576,053 A | * | 3/1986 | Hatamura | ....................... 338/5 |
| 4,576,158 A | * | 3/1986 | Boland | ........................ 606/102 |
| 4,630,490 A | | 12/1986 | Malicki | |
| 4,823,606 A | | 4/1989 | Malicki | |
| 5,076,375 A | * | 12/1991 | Dillon et al. | ............. 177/25.19 |
| 5,161,594 A | | 11/1992 | Bolton et al. | |
| 5,339,696 A | | 8/1994 | Carignan | |
| 5,386,724 A | | 2/1995 | Das et al. | |
| 5,639,487 A | * | 6/1997 | Wurst et al. | ................. 425/149 |
| 5,717,143 A | | 2/1998 | Jenco et al. | |
| 5,728,044 A | * | 3/1998 | Shan | ............................ 33/512 |
| 5,783,751 A | * | 7/1998 | Maw et al. | ..................... 73/761 |

OTHER PUBLICATIONS

"Low Leak, High Flow Poppet Valve," NASA Tech Briefs, Jun. 1995, pp. 74–75.

\* cited by examiner

*Primary Examiner*—Max Noori
*Assistant Examiner*—Lilybett Martir
(74) *Attorney, Agent, or Firm*—TraskBritt

(57) ABSTRACT

An instrument pin member is provided that is capable of measuring bending moments and optionally of measuring bending and axial strain in real or near real time. The instrumented pin member includes a pin member body disposed about a pin member axis, wherein the pin member body includes a bending portion. A sensing device is positioned at the pin member body within the bending portion for sensing a bending strain in the bending portion exclusive of a net axial strain, and for outputting a sensor measurement signal representative of the bending strain. A sensor measurement signal output device is provided for outputting the sensor measurement signal from the sensing device. A related system includes a plurality of pin members, among other things. Related methods also are disclosed.

34 Claims, 6 Drawing Sheets

METHOD AND APPARATUS FOR MEASURING BENDING IN A PIN MEMBER

GOVERNMENT LICENSING CLAUSE

The U.S. Government has a paid-up license in this invention and the right in limited circumstances to require the patent owner to license others on reasonable terms as provided for by the terms of NAS8-38100 awarded by the National Aeronautics and Space Administration.

BACKGROUND OF THE INVENTION

1. Field of the Invention

The present invention relates to instrumented coupling devices and methods and, more specifically, to apparatus and methods for measuring or predicting bending in a pin member used to couple a joint.

2. Description of the Related Art

A common means of joining two mechanical bodies together involves the use of one or more pin members disposed through aligned and mating apertures. A "pin member" as the term is used herein may be interpreted broadly to include such devices as bolts, screws, pins, axles, and the like. The joint may take any one of a number of forms. It may, for example, comprise a flanged joint between two pipes, pressure vessel housings, a flanged joint between two solid rocket motor casings, clevis and yoke assemblies, etc.

Under operating conditions, a variety of forces act on the pin member. These forces include tension and compression forces along the longitudinal axis of the pin member, or with force components along that axis, shear forces normal to the longitudinal axis of the pin member, torsional forces, and bending moments.

Apparatus and methods have been known for instrumenting a pin member to measure tension, compression shear, and/or torsion. For example, the use of various types of strain gages to measure such forces are well known. Sensing devices also are known in which such strain gages are used in combination with bridge circuitry such as a Wheatstone bridge.

The effective measurement of bending forces, however, has eluded effective measurement. Bending forces in many mechanical systems are particularly incideous forces, e.g., because they typically isolate a relatively large stress in a localized area. It is often highly desirable to design a component or system so that bending forces and their detrimental effects can be minimized. The direction of bending can be important in some applications, for example, because pin member through-hole radial translation with respect to the pin member shaft often can result in unobvious bending directions with respect to the ideal. The measurement of bending forces or moments often is particularly difficult, however, because the direction of the force can change, sometimes rapidly, over time. In the case of solid rocket motor joints, for example, when the rocket motor is fired, bending moments can be vary substantial and their direction can vary widely.

BRIEF SUMMARY OF THE INVENTION

Accordingly, the present invention provides an instrumented pin member that can effectively measure bending stresses within the pin member.

Advantages of the invention will be set forth in the description which follows and, in part, will be apparent from the description, or may be learned by practice of the invention. The advantages of the invention may be realized and obtained by means of the instrumentalities and combinations pointed out in the appended claims.

In accordance with the purposes of the invention as embodied and broadly described in this document, an instrumented pin member is provided. The instrumented pin member comprises a pin member body disposed about a pin member axis. The pin member body comprises a bending portion. The instrumented pin member further comprises a sensing device positioned at the pin member body within the bending portion for sensing a bending strain in the bending portion exclusive of a net axial strain and for outputting a sensor measurement signal representative of the bending strain. In addition, the instrumented pin member comprises a sensor measurement signal output device for outputting the sensor measurement signal from the sensing device.

Preferably, but optionally, the sensing device senses components of the bending strain in the bending portion along an x axis and a y axis, wherein the x axis and the y axis are orthogonal to the pin member axis and to each other.

The pin member body may comprise a bolt, a pin, a screw, an axle, and the like. Preferably, but optionally, the pin member body has a cylindrical shape about the pin member axis. The pin member head preferably includes a head, and the bending portion is adjacent to the head.

The sensing device preferably comprises first and second x axis sensor elements for measuring the bending strain along the x axis, and first and second y axis sensor elements for measuring the bending strain along the y axis.

Each of the first and second x axis sensor elements preferably comprises an axial sensor for sensing strain in a pin member axial direction corresponding to the pin member axis. The pin member body preferably comprises a shank including a shank perimeter lying in a plane orthogonal to the pin member axis. Each of the first and second x axis sensor elements also preferably comprises a tangential sensor for sensing strain in a direction tangential to the shank perimeter.

In the presently preferred embodiments, each of the first and second y axis sensor elements comprises an axial sensor for sensing strain in a pin member axial direction corresponding to the pin member axis. The pin member body preferably comprises a shank including a shank perimeter lying in a plane orthogonal to the pin member axis, and each of the first and second y axis sensor elements also preferably comprises a tangential sensor for sensing strain in a direction tangential to the shank perimeter.

The sensing device preferably comprises an x axis bridge having a left side and a right side, wherein the left x axis bridge side comprises first and second positions and the right x axis bridge side comprises first and second positions. The first position of the left x axis bridge side and the first position of the right x axis bridge side are in a first aligned x axis configuration, and the second position of the left x axis bridge side and the second position of the right x axis bridge side are in a second aligned x axis configuration. In the preferred embodiments, the axial sensors of the first and second x axis sensor elements are in one of the first aligned x axis configuration and the second aligned x axis configuration. The sensing device of the preferred embodiments comprises an axial stress measurement configuration and a bending stress measurement configuration. The sensing device is in the bending stress measurement configuration when the axial sensors of the first and second x axis sensor elements are in one of the first aligned x axis configuration and the second aligned x axis configuration. The sensing device is in the axial stress measurement configuration when the axial sensors of the first and second x axis sensor elements are not in one of the first aligned x axis configuration and the second aligned x axis configuration. Similarly, the tangential sensors of the first and second x axis sensor elements preferably are in one of the first aligned x axis configuration and the second aligned x axis configuration for measurement of bending. Where the sensing device can assume an axial stress measurement configuration and a bending stress measurement configuration, the sensing device preferably is in the bending stress measurement configuration when the tangential sensors of the first and second x axis sensor elements are in one of the first aligned x axis configuration and the second aligned x axis configuration. It is in the axial stress measurement configuration when the tangential sensors of the first and second x axis sensor elements are not in one of the first aligned x axis configuration and the second aligned x axis configuration.

The sensing device according to presently preferred embodiments similarly comprises a y axis bridge having a left side and a right side, wherein the left y axis bridge side comprises first and second positions and the right y axis bridge side comprises first and second positions. The first position of the left y axis bridge side and the first position of the right y axis bridge side are in a first aligned y axis configuration, and the second position of the left y axis bridge side and the second position of the right y axis bridge side are in a second aligned y axis configuration. The axial sensors of the first and second y axis sensor elements preferably are in one of the first aligned y axis configuration and the second aligned y axis configuration for measurement of bending. Where the sensing device can assume axial and bending measurement configurations or modes, the sensing device preferably is in the bending stress measurement configuration when the axial sensors of the first and second y axis sensor elements are in one of the first aligned y axis configuration and the second aligned y axis configuration, and the sensing device is in the axial stress measurement configuration when the axial sensors of the first and second y axis sensor elements are not in one of the first aligned y axis configuration and the second aligned y axis configuration. Similarly, the tangential sensors of the first and second y axis sensor elements preferably are in one of the first aligned y axis configuration and the second aligned y axis configuration. The sensing device preferably is in the bending stress measurement mode when the axial sensors of the first and second y axis sensor elements are in one of the first aligned y axis configuration and the second aligned y axis configuration, and it is in the axial stress measurement configuration when the axial sensors of the first and second y axis sensor elements are not in one of the first aligned y axis configuration and the second aligned y axis configuration.

The instrumented pin member preferably, but optionally, also comprises a switching device operatively coupled to the sensing device for switching between an axial stress measurement configuration and a bending stress measurement configuration. The switching device may comprise a solid state switching circuit. The switching device may be and, preferably, is positioned at the pin member head. In a presently preferred embodiment, the pin member head includes an external surface and a notch disposed in the external surface, and the switching device is mounted to the external surface. The pin member head also may comprises a head including a head cavity, and the switching device may be positioned at the pin member head cavity.

The switching device preferably comprises a periodic switching signal source for providing a periodic switching signal. In the presently preferred embodiments, the periodic signal comprises a square wave signal that alternately switches between a high and low state.

Where the sensing device comprises a pair of bridges, each having an axial stress measurement configuration and a bending stress measurement configuration, the switching device preferably comprises a switch operatively coupled to the pair of bridges, for switching the pair of bridges between the axial stress measurement configuration and the bending stress measurement configuration. Preferably, but optionally, the switching device switches the pair of bridges to the bending stress measurement configuration substantially simultaneously.

In accordance with another aspect of the invention, a system is provided for measuring bending at a joint. The system according to this aspect of the invention comprises an instrumented pin member disposed at the joint, wherein the instrumented pin member comprises a pin member body disposed about a pin member axis. The pin member body comprises a bending portion. The pin member further includes a sensing device positioned at the pin member body within the bending portion for sensing a bending strain in the bending portion exclusive of a net axial strain, and for outputting a sensor measurement signal representative of the bending strain. The pin member further includes a sensor measurement signal output device for outputting the sensor measurement signal from the sensing device. The system also includes a data receiving device operatively coupled to the sensor measurement signal output device for receiving the sensor measurement signal.

Preferably, but optionally, the system comprises a switching device operatively coupled to the sensing device for switching the sensing device in and out of a bending stress mode. The system preferably, but optionally, comprises a plurality of the instrumented pin members.

The data receiving device may comprise a data processor, a data display, and/or other data receiving and/or data handling/processing components.

In accordance with still another aspect of the invention, a method is provided for measuring bending at a joint. The method comprises disposing an instrumented pin member at the joint. The instrumented pin member comprises a pin member body disposed about a pin member axis, the pin member body comprising a bending portion. The method further includes sensing a bending strain in the bending portion exclusive of a net axial strain during a bending stress measurement mode and outputting a sensor measurement signal, and communicating the sensor measurement signal to a data receiving device. The disposing of the instrumented pin member preferably comprises disposing a plurality of the instrumented pin members at the joint so that the instrumented pin members are substantially equally spaced about the joint. The sensing preferably includes switching in and out of the bending stress measurement mode.

With the presently preferred embodiments of the invention, it is possible to reliably and accurately measure the magnitude and direction of bending moments in a pin member, in real or near real time, and under actual operating conditions. Using, among other things, an arrangement in which net axial strain, i.e., net tension and compression measurements, is canceled out, and optionally in which the measurement device switches between tension/compression measurements and bending measurements, it is possible to obtain highly accurate bending moment information, including not only the presence of bending forces and their magnitude, but also direction as a function of time. With the embodiments disclosed herein, it is possible to automatically switch in periodic fashion from measuring axial strain or preload while disregarding or isolating out bending and torsional stress, and independently or alternately measure bending magnitude and direction while disregarding or isolating out axial and torsional stresses. This permits the essentially simultaneous measurement of bending moments and axial loads.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention.

DETAILED DESCRIPTION OF THE PREFERRED EMBODIMENTS AND METHODS

Figure 1:
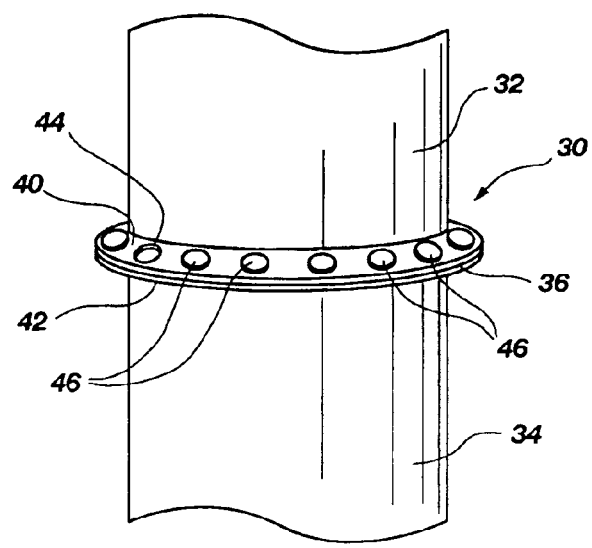
FIG. 1 is a perspective elevational view of a bolted joint between two vessels, in which joint instrumented bolts according to a presently preferred embodiment of the present invention have been incorporated to illustrate the principles and possible applications of the invention.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

In accordance with one aspect of the invention, an instrumented pin member is provided. The instrumented pin member according to this aspect may take the form of or comprise a bolt, a screw, a pin, or the like. In many applications, the pin member will have a round or substantially round shank, although this is not necessarily limiting. It is possible, for example, to have an oval, square, rectangular or like shape for the shank portion of the pin member.

In accordance with a related aspect of the invention, one or more such pin members may be used as part of a system for measuring bending stresses at a joint. In any case, the instrumented pin member or members preferably will take the general form, at least in size, shape, etc., of the actual, normally noninstrumented pin members used to secure a joint. This will generally be true at least where the objectives of the use include predicting the stresses and related performance of the noninstrumented pin member, although it is not necessarily limiting.

To illustrate these principles, a solid rocket motor 30 having first and second casing members 32 and 34 is shown in FIG. 1. Casing members 32 and 34 are joined and mate to one another at a circular joint 36. First and second casing members 32 and 34 include respective circular flanges 40 and 42 for mating and securing the casing members to one another. These flanges 40 and 42, which form or comprise joint 36, include a plurality of mated flange apertures 44. Under normal operating conditions, a pin member in the form of a noninstrumented bolt 46 would be placed in each of the apertures 44 to collectively secure the flanges 40 and 42, and thus the casing members 32 and 34, together.

Optionally, but preferably, one or more instrumented pin members, e.g., as described more fully herein, can be substituted at joint 36 for selected ones of noninstrumented pin members 46 so that when motor 30 is fired, the instrumentation, again, for example, as described herein, can measure bending stresses within these instrumented pin members, i.e., at joint 36. A plurality of these instrumented pin members may be disposed, for example, by uniformly distributing them around joint 36, or in other predetermined arrangements. The bending stress data, and in some instances other data as well, from the instrumented pin member or pin members can be used to simulate, estimate or otherwise predict the same stresses that are occurring in the normal operational, noninstrumented pin members and at the joint itself.

Figure 2:
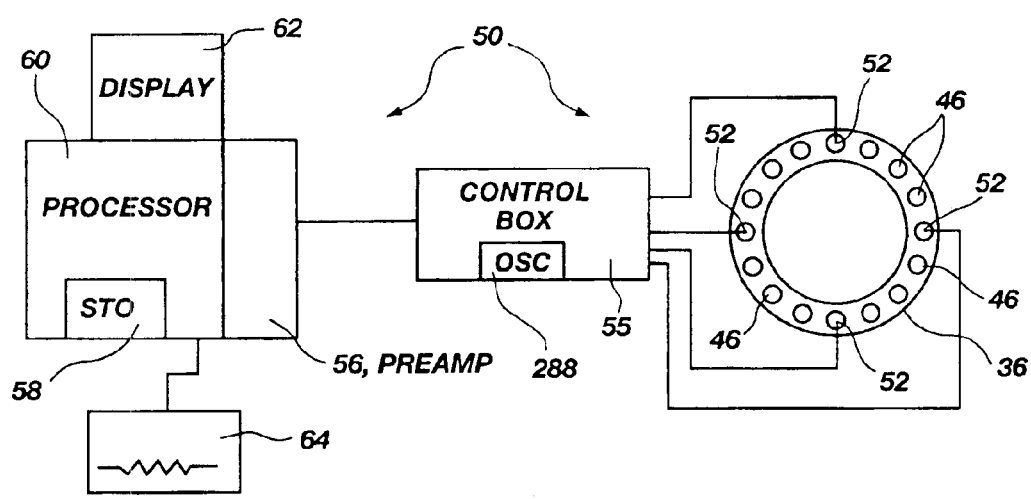
FIG. 2 is a block diagram of a system according to a presently preferred system embodiment of the invention.

FIG. 2 shows a functional block diagram of a system 50 according to a presently preferred system embodiment of the invention, which would be suitable, for example, for predicting bending stresses in the pin members 46. The system 50 comprises a plurality of instrumented pin members 52 according to a presently preferred embodiment. Each pin member 52 may be assumed, for purposes of reference and illustration, to be disposed about a longitudinal pin member axis 54 (see FIG. 3). Pin members 52 are uniformly distributed about joint 36 among the noninstrumented pin members 46.

System 50 also comprises a control box 55, a preamplifier ("preamp") or data conditioner 56, a storage device 58, e.g., a hard drive on a computer, a processor 60, e.g., such as the processor of a commercially-available personal computer or small business computer, and a display monitor 62. A data recording device 64 such as a strip chart recorder or other device useful for recording data from the instrumented pin members may be used as well. In presently preferred embodiments, the system comprises a computer, preferably having a 12 bit range or above, and a control box 55. Control box 55 is positioned between the pin members 52 and preamp 56 and, preferably, is located as close to the pin members as is practicable under the circumstances with respect to the electrical connections. Control box 55 is electrically coupled to the sensors, as described below, and receives signals, e.g., analog sensor measurement output signals, from them. It includes an oscillator as described further below, and an opto-isolator for assisting in isolating the digital signals from the analog signals. Control box 55 is capable of operating in three modes, i.e., a pure axial measurement mode, a pure bending mode, and a switching mode in which it alternates between an axial stress measurement mode and a bending stress measurement mode.

Figure 3:
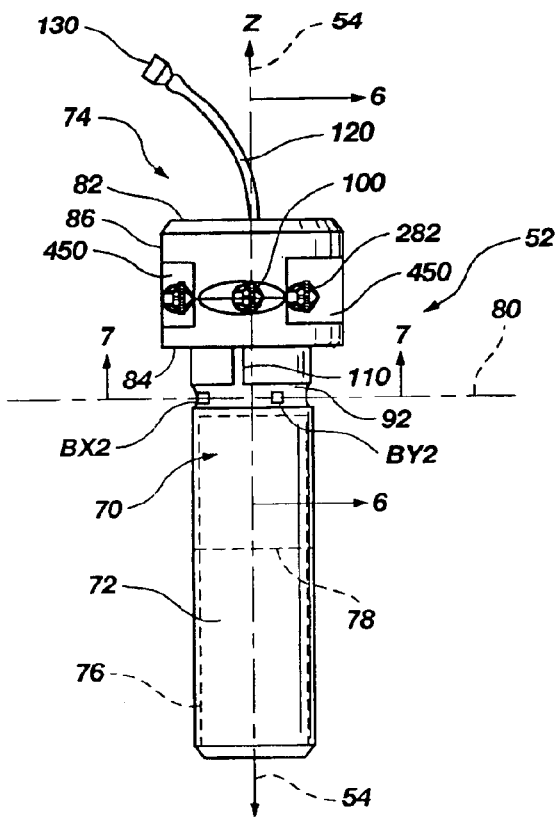
FIG. 3 is a side view of an instrumented pin member according to a first preferred embodiment of the invention.
Figure 4:
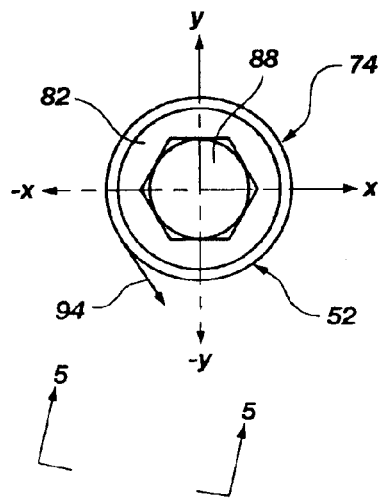
FIG. 4 is a top axial view of the instrumented pin member of FIG. 3.

An instrumented pin member 52 according to a first presently preferred embodiment of this aspect of the invention is shown in side view in FIG. 3 and in top or plan view in FIG. 4. Pin member 52 comprises a pin member body 70, which for purposes of illustration may be assumed to be disposed about pin member longitudinal axis 54. To aid in illustration, a conventional three-axis rectilinear coordinate system may be assumed to exist at the pin member. Pin member longitudinal axis 54 is assumed herein to correspond to the z axis, as indicated in FIG. 3. The mutually orthogonal x and y axes are assumed to lie in a plane normal to the z axis, as indicated in FIG. 4. The instrumented pin members as described herein below use a sensing device to measure components of the bending strain in the bending portion along the x and y axes.

The instrumented pin member optionally may be constructed from an operational pin member of the type normally used at the joint. In the illustrative embodiments described herein, for example, a bolt 46 (FIG. 1) is used as a starting component and is modified as described herein below to obtain each instrumented pin member 52.

With reference to the first preferred but merely illustrative embodiment, pin member 52 comprises a bolt having a pin member body 70 in the form of a shank 72 and head 74. This is not necessarily limiting, however. The instrumented pin member may comprise forms other than a bolt, such as those pin member types noted above. In many applications, the pin member body may have a cylindrical shape about the pin member axis, at least within the shank portion. In this illustrative embodiment, bolt 52 is a steel bolt having a length along longitudinal pin member axis 54 of about 3 inches. Shank 72 includes threads 76 having a major or outside diameter of about 0.75 inch. Shank 72 has a shank perimeter 78 lying in a plane 80 orthogonal to longitudinal pin member axis 54. Plane 80, of course, is a theoretical or geometric construct used for illustrative and reference purposes.

Pin member head 74 comprises a top portion 82, a base portion 84, and a cylindrical wall portion 86. Pin member head 74 is sized and configured to secure pin member 52 in the flange aperture 44. In this embodiment, head 74 has an outside or radial diameter of about 1.1 to 1.2 inches. Where the pin member comprises a bolt, screw, or other device in which it would be appropriate to turn or torque the head to control the pin member, e.g., to tighten or loosen it, pin member head 74 may comprise an appropriate means for turning or wrenching the pin member. Examples of such means would include a hex or octal head, a star configuration, a broach for use with an allen wrench or similar device, etc. In pin member 52 according to the presently preferred embodiment, pin member head 74 includes a broach 88 for mating with an allen wrench.

The pin member body 70 according to this aspect of the invention also comprises a bending portion. This portion of the pin member body undergoes bending stresses and experiences associated strains under normal operating conditions for the joint and the device of which it forms a part, e.g., the rocket motor. The bending portion, as referred to herein, need not constitute the entire portion of the pin member that is subject to bending stresses or strains. It does, however, comprise at least a portion of the pin member body that is subject to bending stress which, in many cases, will include the entire member. The "bending portion," as the term is used herein, refers to any area or portion of the pin member 52 that is suitable for measurement of bending moments under the application and circumstances. Preferably, the bending portion is selected to be a region of the pin member that experiences substantial strain relative to other parts of the pin member during normal operating conditions, and which is representative of the strain occurring in the entire portion of the pin member that is subject to such bending forces. The bending portion, in many instances, will comprise the area immediately adjacent to the pin member head.

As implemented in the preferred embodiment, pin member body 70 includes a bending portion 90 disposed in the upper portion of shank 72 as shown in FIG. 3, just below base portion 84 of head 74. Bending portion 90 in this specific embodiment may be assumed to extend from base portion 84 of head 74 downward in the direction of longitudinal pin member axis 54 along shank 72 approximately 0.2 inch.

Figure 7:
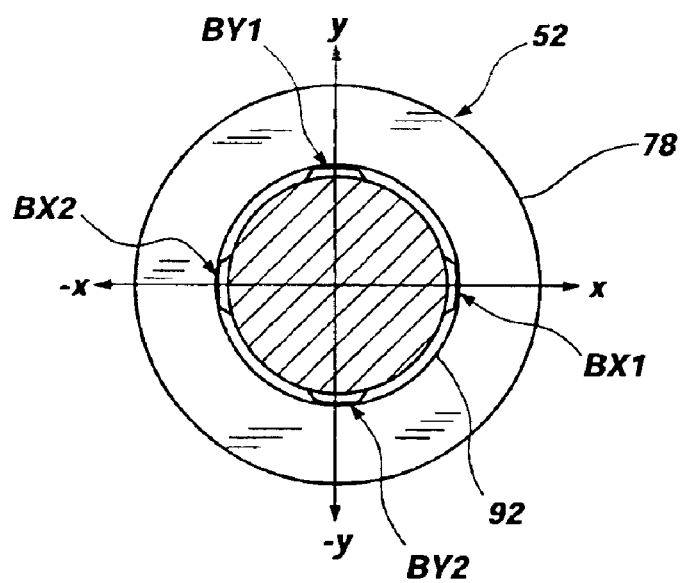
FIG. 7 is an axial or top cut-away view of the head and upper shank portion of the instrumented pin member of FIG. 3, taken along lines 7—7.

Pin member 52 includes a radially chamfered groove 92 in bending portion 90. It preferably is positioned on shank 72 below the base portion 84 of head 74. The positioning of the groove preferably is selected so that unwanted contributions from localized effects at and around the base portion 84 of head 74 are avoided, and so that there is no unwanted interference with the head during installation, maintenance, etc. This groove 92 may be disposed in the shank portion, for example, by lathing pin member 52. The depth of groove 92 radially with respect to perimeter 78 of shank 72 and the length along the longitudinal pin member axis 54 (z axis) may be selected to house and accommodate sensors and associated circuitry, as will be described herein below. In the presently preferred embodiments, and using the sensors as described herein below, the depth of groove 92 is approximately equal to the depth of the minor thread diameter of the shank threads. Preferably, it is no smaller than the thread root, e.g., to avoid adverse effects on the strength of the pin member. Groove 92 is shown in highly exaggerated depth in FIG. 7 to better illustrate.

Further, in accordance with this aspect of the invention, the instrumented pin member includes a sensing device positioned at the pin member body within the bending portion for sensing a bending strain in the bending portion exclusive of a net axial strain and for outputting a sensor measurement signal representative of the bending strain. The sensing device senses the bending strain in the bending portion exclusive of a net axial strain in the sense that it is capable of sensing bending strains and, thus, bending moments, in the bending portion of the pin member, without the measurement being adversely affected by a net axial strain, i.e., without adverse interference or effects of a net tension or compression of the pin member. This may be done, and in the presently preferred embodiments is done, using, among other things, a sensing device wherein such net axial strain components are canceled out.

The sensing device may comprise essentially any sensor or measuring device, or any collection of sensors or measuring devices, capable of sensing strain within the portion of the instrumented pin member to which the sensor or sensors are applied. The specific sensor or sensors used in a particular application may depend upon a number of factors, for example, such as the size of the pin member, the available size and geometry for groove 92, the material from which the pin member is constructed, the nature and extent of the anticipated forces on the pin member and sensor, the durability and requirements of the sensor or sensors with respect to the specific application and operational environment, other equipment with which the device is to be used, etc.

The sensing device, according to this aspect of the invention, preferably comprises first and second x axis sensor elements for measuring the bending strain along the x axis and first and second y axis sensor elements for measuring the bending strain along the y axis. The sensor elements preferably lie in a plane orthogonal with respect to the pin member longitudinal axis, for example, such as plane 80. In presently preferred embodiments, each of the first and second x and y axis sensor elements comprises an axial sensor for sensing strain in a pin member axial direction corresponding to the pin member axis and a tangential sensor for sensing strain in a direction tangential to the shank perimeter. The tangential direction in these embodiments involves a tangent to shank perimeter, or more accurately to the slightly smaller perimeter of groove 92 in planes orthogonal to longitudinal pin member axis 54 where the sensors reside, for example, as identified in FIG. 7 by reference number 94. Tangential direction 94 thus represents tangent vectors to shank perimeter 78, or to the perimeter of groove 92, and thus constitutes a circumferential tangent to the shank or groove circumference. Given that radial depth of groove 92 in many applications will be quite small relative to the shank diameter, the perimeter for groove 92 and the shank perimeter at a given radial location will be essentially the same.

The sensing device, according to the preferred embodiments, will now be described. In these illustrative embodiments, a sensing device is provided which comprises first and second x axis sensor elements BX1 and BX2, respectively, and first and second y axis sensor elements BY1 and BY2, respectively (shown in FIG. 7). Each of the sensor elements lies on the perimeter of groove 92, and thus essentially at shank perimeter 78, all within plane 80. Sensor elements BX1 and BX2 lie along the x axis on opposite sides of shank perimeter 78, and sensor elements BY1 and BY2 lie on the y axis on opposite sides of shank perimeter 78. The x axis sensor elements, thus, are disposed at 90 degrees with respect to the y axis sensor elements. Each of the sensor elements BX1, BX2, BY1 and BY2 comprises a pair of sensors including an axial or "tension" sensor, denoted by a "T," and a tangential or "compression" sensor, denoted by a "C" after the sensor element designation, e.g., BX1(T) or BX1(C).

The sensors may comprise any sensor or measuring device that can be affixed to the bending portion of the pin member and can sense or measure strain in the appropriate directions as generally described herein. Strain gages are preferred. In the presently preferred embodiments, each of the sensors comprises a strain gage, such as Model EA-06-062TZ-350, commercially available from Micro-Measurements, Measurement Group, Inc. of Wendell, N.C. The sensors of each sensor element, e.g., sensors BX1(T) and BX1(C), are positioned immediately adjacent to one another, as close as is reasonably practicable without interfering with one another, and so that installation, servicing or repair, and possibly removal of one sensor can be undertaken without interfering with or damaging the other sensor of that sensor element.

The sensors and sensor elements are positioned and affixed to pin member 52 by attaching or fastening them to the appropriate locations, as indicated in FIGS. 3 and 5–7, using appropriate fastening means. Such fastening means may include bonding the sensors using a suitable bonding agent, for example, such as an epoxy or other adhesive. In the presently preferred embodiments, the sensors are bonded to shank 72 within groove 92 using an epoxy, such as M-BOND 200 or M-BOND 600, also commercially available from Micro-Measurements, Measurement Group, Inc. of Wendell, N.C. Where protection of the sensors is necessary or appropriate, e.g., from vibration, thermal loads, etc., it may be desirable to provide a suitable insulator between the shank and sensor. An example would include a tape such as Kapton tape with a silicon adhesive.

Figure 11:
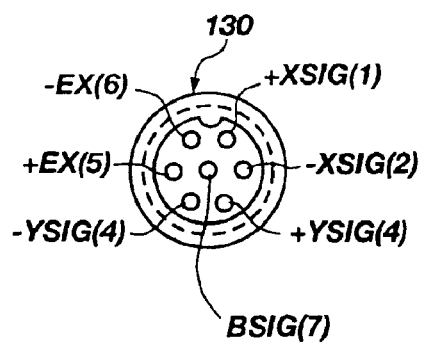
FIG. 11 shows an end view of a connector used in the instrumented pin member of FIG. 3.

Each sensor (strain gage) outputs a sensor measurement signal comprising strain measurements taken by that sensor. Each of the sensors has electrically coupled to it a pair of wire or conductor leads 100 for providing power to the sensor and for communicating the sensor measurement signal from the sensor. Leads 100 in the presently preferred embodiments comprise, for example, polyimide Kapton insulated wire having a diameter of 0.005 inches. Leads 100 run from the respective sensors to a pair of axial notches 110, in this embodiment one axial notch 110 per side of the shank, i.e., two axial notches. The top of notches 110, i.e., at base portion 84 of head 74, leads to an angled channel 112 extending through the lower portion of head 74 and ending at an aperture 114 as shown in FIG. 6. A vertical channel 116 extends vertically within head 74, having an opening at its bottom portion into aperture 114, and having an aperture 118 at top portion 82 of head 74. Leads 100 extend from the sensors, along groove 92 to the appropriate or nearest one of notches 110, through angled channel 112, into and up vertical channel 116, and out the top of head 74 at aperture 118. A strain relief means, such as rubber surgical tubing 120 (FIG. 5) or the like, is disposed at aperture 118 to facilitate the exit of leads 100 without damaging them. A shielded cable 122 may be used to contain leads 100. Leads 100 are electrically coupled to a connector 130 (FIG. 11), as will be described in greater detail below.

Figure 8:
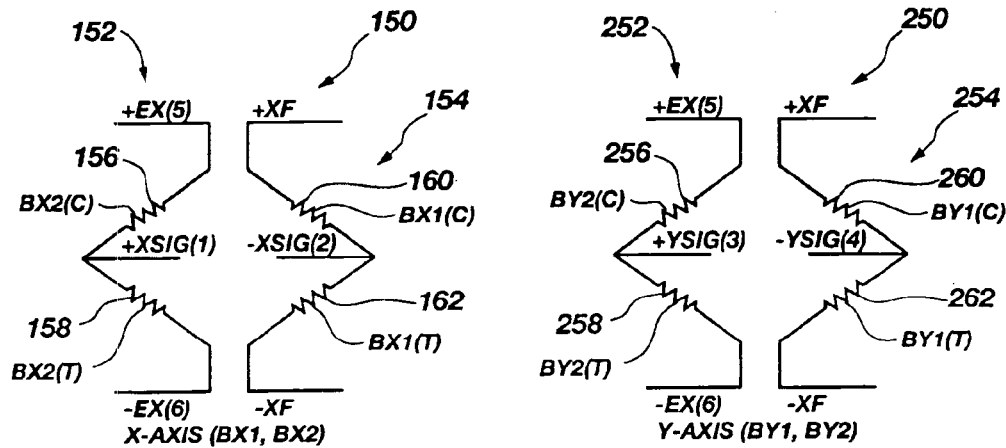
FIG. 8 is an electrical schematic diagram of a bridge assembly according to a bending stress measurement configuration used in the instrumented pin member of FIG. 3.
Figure 9:
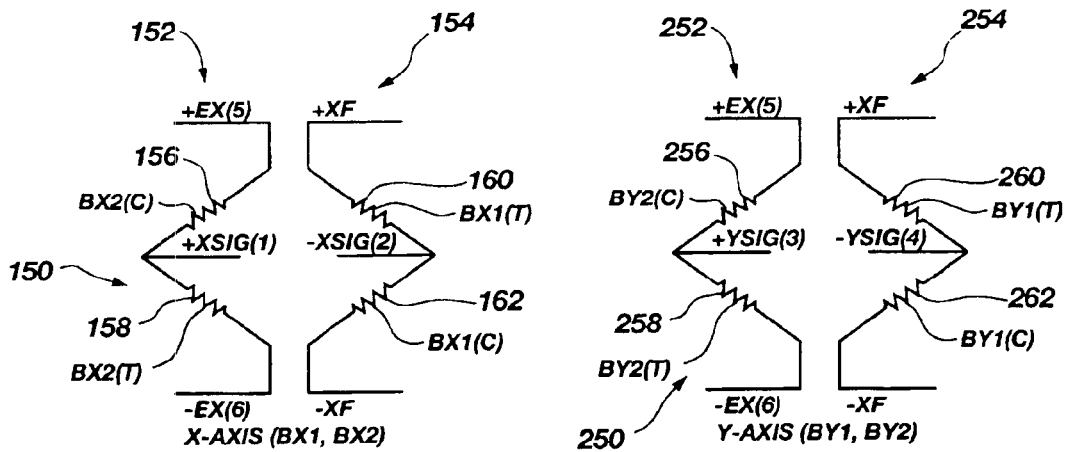
FIG. 9 is an electrical schematic diagram of a bridge assembly according to an axial stress measurement configuration used in the instrumented pin member of FIG. 3.

The sensing device, according to presently preferred embodiments of the invention, comprises a bridge assembly for receiving the sensor measurement signals and making necessary or appropriate conversions to measure bending stress. In these embodiments, the bridge assembly can assume an axial stress measurement configuration and a bending stress measurement configuration. The bridge assembly may comprise a single bridge but, preferably and optionally, comprises a pair of bridges, which still further preferably comprises an x axis bridge and a y axis bridge. A single bridge can be useful in detecting bending strains but typically will not include directional information, or will measure only components of strain along a single plane. In accordance with the presently preferred embodiments, the sensing device comprises a pair of bridges, specifically an x axis bridge 150 and a y axis bridge 250, for example, as shown in FIGS. 8 and 9. In these embodiments, each of the bridges 150 and 250 comprises a full active Wheatstone strain gage bridge.

The x axis bridge, in preferred embodiments, comprises a left side and a right side. The left x axis bridge side comprises first and second positions and the right x axis bridge side comprises first and second positions. The first position of the left x axis bridge side and the first position of the right x axis bridge side comprise what may be termed a "first aligned x axis configuration," and the second position of the left x axis bridge side and the second position of the right x axis bridge side comprise what may be termed a "second aligned x axis configuration." Similarly, the y axis bridge, in preferred embodiments, comprises a left side and a right side. The left y axis bridge side comprises first and second positions and the right y axis bridge side comprises first and second positions. The first position of the left y axis bridge side and the first position of the right y axis bridge side comprise what may be termed a "first aligned y axis configuration," and the second position of the left y axis bridge side and the second position of the right y axis bridge side comprise what may be termed a "second aligned configuration." The first aligned x axis configuration corresponds to the first aligned y axis configuration, and the second aligned x axis configuration corresponds to the second aligned y axis configuration, as will be illustrated further herein below.

As specifically implemented in the presently preferred embodiments, x axis bridge 150 comprises a left side 152 and a right side 154. Y axis bridge 250 similarly comprises a left side 252 and a right side 254. X axis bridge 150 at its left side 152 includes a first position 156 and a second position 158, and at its right side 154 includes a first position 160 and a second position 162. Similarly, y axis bridge 250 at its left side 252 includes a first position 256 and a second position 258, and at its right side 254 includes a first position 260 and a second position 262. In these embodiments, first x axis positions 156 and 160 are aligned, and second positions 158 and 162 are aligned. Positions 156 and 162 are opposed, as are positions 158 and 160. Similarly with respect to the y axis bridge 250, first y axis positions 256 and 260 are aligned, and second positions 258 and 262 are aligned. Positions 256 and 262 are opposed, as are positions 258 and 260.

With reference to FIGS. 8 and 9, x axis bridge 150 has a power source at its left side 152 comprising a positive voltage +EX(5) at a top terminal, electrically coupled to first position 156, and a negative voltage −EX(6) electrically coupled to second position 158. The "EX" portion refers to an excitation voltage, which terminology is common in the field. The numeral in parenthesis represents the pin number of connector 130 corresponding to that voltage level or signal. X axis bridge 150 also has a power source at its right side 154 comprising positive voltage +XF coupled to first position 160 and a negative voltage −XF coupled to second position 162. The y axis bridge 250 is similarly configured. Y axis bridge 250 has a power source at its left side 252 comprising a positive voltage +EX(5) coupled to first position 256 and a negative voltage −EX(6) coupled to second position 258. Y axis bridge 250 also has a power source at its right side 254 comprising positive voltage +XF coupled to first position 260 and a negative voltage −XF coupled at second position 262. "Aligned configurations," as the term is used herein, refers to positions in a given bridge wherein two of the positions are aligned as noted above, i.e., first position to first position or second position to second position within a given bridge, as illustrated in FIGS. 8 and 9. "Opposed configurations," as the term is used herein, refers to positions in a given bridge wherein two of the positions are opposite one another as described above and as illustrated in FIGS. 8 and 9.

When measuring bending stresses with embodiments comprising the x axis and y axis bridges as heretofore described, either the axial sensors of the first and second x axis sensor elements are in one of the first aligned configuration and the second aligned configuration or the tangential sensors of the first and second x axis sensor elements are in one of the first aligned configuration and the second aligned configuration, or preferably both are so configured. With reference to FIG. 8, for example, a first aligned configuration involves aligned resistances from top left to top right as shown in the figure, e.g., positions 156 to 160. The second aligned configuration involves aligned resistances from bottom left to bottom right, e.g., positions 158 and 162. The same applies to y axis bridge 250.

With respect to the presently preferred embodiments, in x axis bridge 150, sensor BX2(C) comprises the resistance at first position 156. By reversing the polarity of the right side of the bridge with respect to that of an axial strain measurement configuration, sensor BX1(C) comprises the resistance at first position 160, as shown in FIG. 8. With this reversed polarity configuration, sensor BX2(T) comprises the resistance at second position 158, and sensor BX1(T) comprises the resistance at second position 162. Similarly with y axis bridge 250, sensor BY2(C) comprises the resistance at first left position 256, sensor BY2(T) comprises the resistance at second left position 258, sensor BY1(C) comprises the resistance at first right position 260, and sensor BY1(T) comprises the resistance at second right position 262. With this configuration, the axial sensors of the first and second x axis sensor elements are in one of the first aligned x axis configuration and the second aligned x axis configuration, and the axial sensors of the first and second y axis sensor elements are in one of the first aligned y axis configuration and the second aligned y axis configuration. Similarly, the tangential sensors of the first and second x axis sensor elements are in one of the first aligned x axis configuration and the second aligned x axis configuration, and the tangential sensors of the first and second y axis sensor elements are in one of the first aligned y axis configuration and the second aligned y axis configuration.

In operation, the sensor configuration shown in FIG. 8 serves to cancel net axial strains (net tension or compression) and measures bending moments. Because separate x and y axis sensors and corresponding separate x axis and y axis bridges are used, it is possible to obtain x and y components, so that the direction of the bending moments can be determined.

The system, comprising instrumented pin members 52 with sensors as described and with bridges as shown in FIG. 8, cancels net axial strains and, therefore, measures bending moments. In presently preferred embodiments, however, it is desired and preferred that each instrumented pin member 52 also be configured to operate in an axial stress measurement mode, in which net axial stress is measured exclusive of bending moments, and a bending stress measurement mode, in which bending stress is measured exclusive of net axial stresses and, preferably, exclusive of torsional stresses as well.

To implement this feature, the sensing device preferably comprises an axial stress measurement configuration, a bending stress measurement configuration, and a switching device operatively coupled to the sensing device for switching between them. The pin member 52, when placed in the axial stress measurement configuration and operated, as described herein, is in the axial measurement mode. When pin member 52 is placed in the bending stress measurement configuration and operated, it is in the bending stress measurement mode.

The sensing device, according to the presently preferred embodiments as disclosed herein, is in the bending stress measurement mode when the axial sensors of the first and second x axis sensor elements are in one of the first aligned x axis configuration and the second aligned x axis configuration, and the axial sensors of the first and second y axis sensor elements are in one of the first aligned y axis configuration and the second aligned y axis configuration. Similarly, the sensing device is in the bending stress measurement configuration when the tangential sensors of the first and second x axis sensor elements are in one of the first aligned x axis configuration and the second aligned x axis configuration, and the tangential sensors of the first and second y axis sensor elements are in one of the first aligned y axis configuration and the second aligned y axis configuration.

The sensing device of the preferred embodiments is in the axial stress measurement configuration when the axial sensors of the first and second x axis sensor elements are not in one of the first aligned x axis configuration and the second aligned x axis configuration, e.g., when they are in an opposed configuration, and when the axial sensors of the first and second y axis sensor elements are not in one of the first aligned y axis configuration and the second aligned y axis configuration, e.g., when they are in the opposed configuration. Similarly, the preferred sensing device is in the axial stress measurement configuration when the tangential sensors of the first and second x axis sensor elements are not in one of the first aligned x axis configuration and the second aligned x axis configuration, and the tangential sensors of the first and second y axis sensor elements are not in one of the first aligned y axis configuration and the second aligned y axis configuration, e.g., they are in the opposed configuration. Thus, by effectively reversing the polarity or arrangement of the sensors (effective resistances) in the bridge, the sensing device can be converted or switched between measuring bending strains and axial strains.

The switching device enables the instrumented pin member to switch between the axial strain measurement configuration and the bending strain measurement configuration, as noted above. This preferably is accomplished in the presently preferred embodiments by using the switching device to adapt and control the configuration of bridges 150 and 250.

In the presently preferred embodiments, alternate readings of tension/compression on the one hand, and bending stresses on the other hand, may be obtained by switching the configuration of the sensors on the right side of the bridges 150 and 250. Accordingly, the switching device for these instrumented pin members may be any device that is capable of operating with the sensors and switching states to alternate the configuration of the respective sensors. Examples of suitable switching devices, therefore, may include a solid state switching circuit, using such components, transistors or the like.

Figure 10:
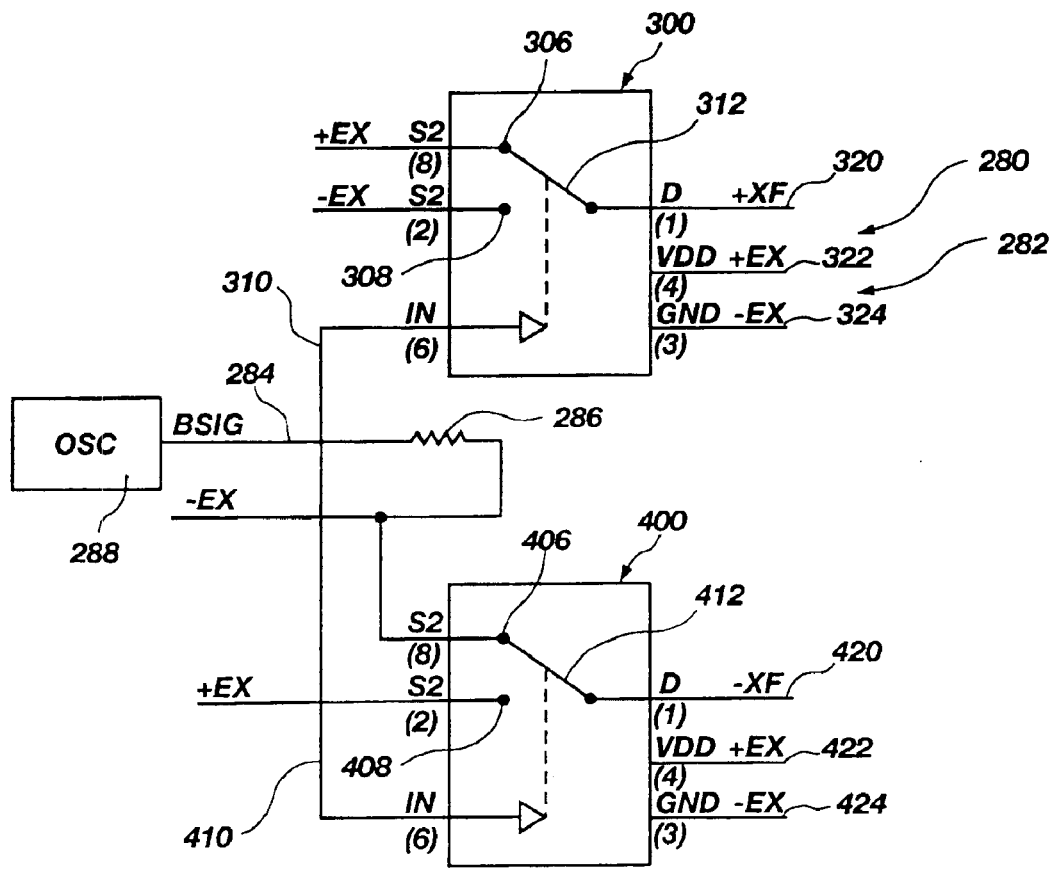
FIG. 10 is an electrical schematic diagram of a switching circuit used in the instrumented pin member of FIG. 3.

A switching device 280, according to the presently preferred embodiments for this aspect of the invention, comprises a pair of identical switching circuits 282, one of which is shown in FIG. 10. Switching circuit 282 comprises a pair of 4-ohm complementary metal oxide semiconductor (CMOS) SPDT switches 300 and 400, each of which comprises a pair of field effect transistors (FET). In these preferred embodiments, switches 300 and 400 comprise an Advanced Micro Devices Model ADG719BRM switch, commercially available from Advanced Micro Devices of Sunnyvale, Calif. Switches 300 and 400 function to reverse the polarity of the right side of bridges 150 and 250, thereby effectively reversing the positions of the sensors at the first and second positions of the right sides of the respective bridges 150 and 250, i.e., between the bridge assembly configurations shown in FIGS. 8 and 9. Switch 300 provides the switched coupling of the bridge line providing voltage +XF, and switch 400 provides the switched coupling of the bridge line providing voltage −XF, as shown in FIGS. 8 and 9. The switches selected for switching circuits 282 preferably have a very low impedance when in the "ON" state and have an extremely high impedance when in the "OFF" state.

Switch 300 comprises switch terminals 306 and 308, at which it receives voltage lines +EX and −EX, respectively. Switch 300 receives as an input at 310 a BSIG signal line 284. The BSIG signal in these embodiments comprises a 0 volt or 5 volt signal that can be used to switch the transistors. Switch 300, under the control of the BSIG signal, controls a two-pole switch handle 312, which closes the line between either terminal 306 or terminal 308. Switch handle 312 is coupled at its output to a line 320 providing voltage +XF to the sensors on the right side of bridges 150 and 250, as shown in FIGS. 8 and 9. Switch 300 also provides as outputs lines 322 and 324 to provide voltages +EX and −EX, which are provided to the sensors on the left side of bridges 150 and 250, as shown in FIGS. 8 and 9.

Switch 400 is identical to switch 300. It comprises switch terminals 406 and 408, at which it receives voltage lines −EX and +EX, respectively. Switch 400 receives BSIG signal line 284 as an input at 410. Switch 400, under the control of the BSIG signal, controls a two-pole switch handle 412, which closes the line between either terminal 406 or terminal 408. Switch handle 412 is coupled at its output to a line 420 providing voltage −XF to the sensors on the right side of bridges 150 and 250, as shown in FIGS. 8 and 9. Switch 400 also provides as outputs lines 422 and 424 to provide voltages +EX and −EX, which are provided to the sensors on the left side of bridges 150 and 250, as shown in FIGS. 8 and 9.

A resistor 286 is located between the input line providing signal BSIG and the line providing voltage −EX at terminals 306 and 406. Resistor 286 in the preferred embodiments comprises a 100 ohm, 0.1 watt metal film chip resistor. This configuration functions to protect the transistors by bleeding off any static energy or voltage buildup on the inputs to the transistors.

A switching signal source 288 is coupled to the line 284 providing signal BSIG for generating the switching signal thereby provided. Preferably, the switching signal comprises a periodic signal that causes the switching circuitry to switch states periodically. It should be noted, however, that this is not necessarily limiting, and that other switch timing relationships are possible. Switching signal source 288 in the preferred embodiments comprises an oscillator that provides a conditioned, periodic square wave for selectively and periodically triggering switches 300 and 400. Switching signal source 288, according to the presently preferred embodiment, is physically located in control box 55 (FIG. 2). Switching signal source 288 also may include circuitry for shaping the signal, as is appropriate for the particular switches used. A frequency divider, for example, may be used to better insure that the switching transistor is precise, e.g., by building up the leading or trailing edge of the square wave. In the presently preferred embodiments, switching circuits 282, under the control of the switching signal BSIG, cause each pin member to switch states between the axial stress measurement configuration and the bending stress configuration at a desired rate, depending upon the application. This switching rate may vary from 0 Hz (steady axial or bending mode) to 40 to 50 KHz and possibly higher. Preferred ranges include 10 Hz to 2 KHz and, more preferably, about 110 to 500 Hz. Higher frequencies such as 30 to 40 KHz may be useful, for example, when investigating mechanical shock or shock wave phenomena. Natural physical limits on the switching frequency may occur, depending on the circumstance, as will be understood by persons of ordinary skill in the art. Physical limits may be placed, for example, by the impedance of lines coupled to the switches, or by the frequency of the phenomena to be measured.

Preferably, the switching circuits cause switching between modes to occur substantially simultaneously among all of the sensors. With an appropriate repetition rate, this can yield an essentially real time or near real time measurement of both axial and bending stresses.

In the presently preferred embodiments, the switching device comprises two sets of the switching circuitry shown in schematic form in FIG. 10. One of the switching circuitry sets is coupled to and operates the sensors on one side of the pin member, and the other circuitry set is coupled to and operates the sensors on the other side of the pin member.

The switching device is preferably physically located on the instrumented pin member. In the preferred embodiments, the switching circuitry sets are disposed on printed circuit (PC) boards or solder tabs that are affixed to or within the head 74 of pin member 52, affixed to its exterior or within it.

Figure 5:
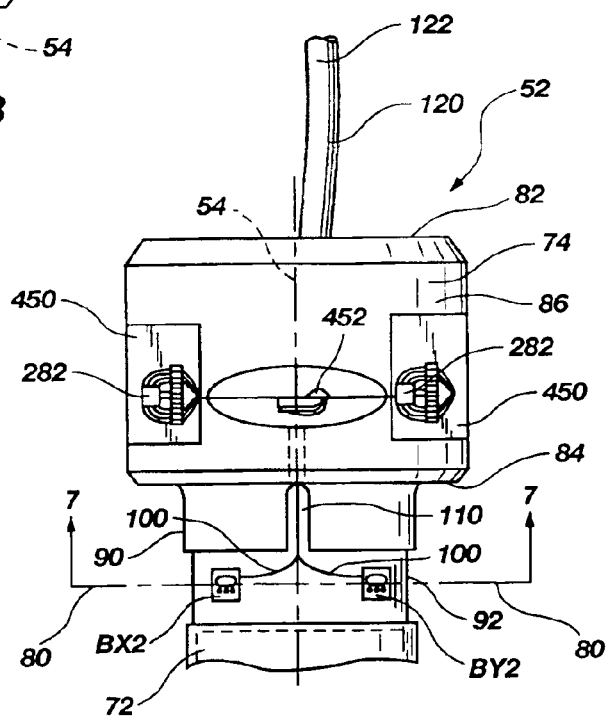
FIG. 5 is an expanded side view of the head and upper shank portion of the instrumented pin member of FIG. 3.
Figure 6:
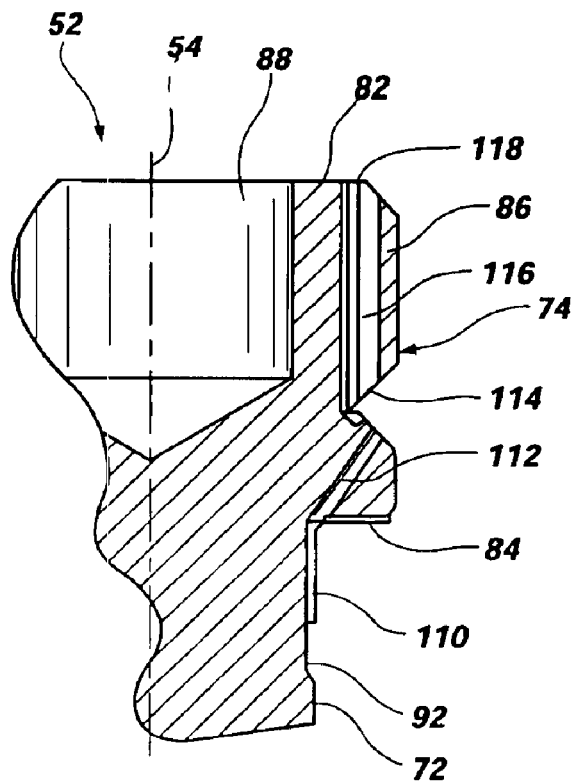
FIG. 6 is a side cut-away view of the instrumented pin member of FIG. 3, taken along cut-away lines 6—6.

With reference to FIGS. 3 and 5, for example, a flat 450, is disposed on each side of head 74 within wall portion 86. The flats preferably are opposite one another with respect to the head diameter. Each flat 450 comprises a substantially planar surface disposed in the side of head 74, for example, by machining, so that the switching circuit sets (FIG. 10) and their supporting solder tabs can be affixed to the surface. The solder tab and switching circuit set are bonded to the flat, for example, using a suitable bonding agent, such as M-BOND 200 or M-BOND 600, commercially available from Micro-Measurements as described above.

A notch 452 is provided along wall portion 86 for passage of leads 100 from the sensors to switching circuits 282. Notch 452 again may be made in wall portion 86 by machining.

Still further in accordance with this aspect of the invention, the instrumented pin member includes a sensor measurement signal output device for communicating the sensor measurement output signal. The sensor measurement signal output device may comprise any means for communicating the sensor measurement output signal to the environment outside the instrumented pin member itself. This device, for example, may comprise leads 100 housed in shielded cable 122 and connector 130. The sensor measurement signal output device may, however, take other forms, depending upon the application, etc. Examples would include a remote transmission means such as electromagnetic (e.g., radio frequency, infrared, optical), acoustic, etc.

In accordance with the preferred embodiments, the sensor signal output device comprises connector 130, as shown in FIG. 1, and shielded cable 122 coupled to it for communicating the signals generated by the respective sensors. The number of leads 100 contained within the cable can depend upon the number of sensors employed in the instrumented pin member, depending upon such things as whether or not a multiplexing technique is used. In the presently preferred embodiment, each sensor element BX1, BX2, BY1, BY2 will have associated with it at least one lead 100, which will constitute a part of the output device.

A second preferred embodiment 1052 of this aspect of the invention will now be described with reference to FIGS. 12 through 15. This embodiment is essentially identical to pin member 52, except that it uses a different pin member head configuration and it locates the switching circuitry in a broach within the top portion of the head, rather than at the cylindrical or sidewall of the head.

It was noted with respect to the previous embodiment that head 74 may include a broach 88 in top portion 82 of pin member head 74, and that switching circuits 282 were affixed to the wall portion 86 of head 74, on flats 450. In this embodiment, the broach 1088 includes an extended cavity 1089, extending relatively further into the head 1074, and the switching circuitry is affixed to an interior wall of the head cavity. In this preferred embodiment, switching circuits 1282, which are mounted on solder tabs as described above, are bonded directly to the interior wall of cavity 1089, e.g., by a suitable bonding agent. A presently preferred bonding agent is M-BOND 200 or M-BOND 600, noted above. Tape or other insulating material may be used to protect the sensing circuitry.

Figure 15:
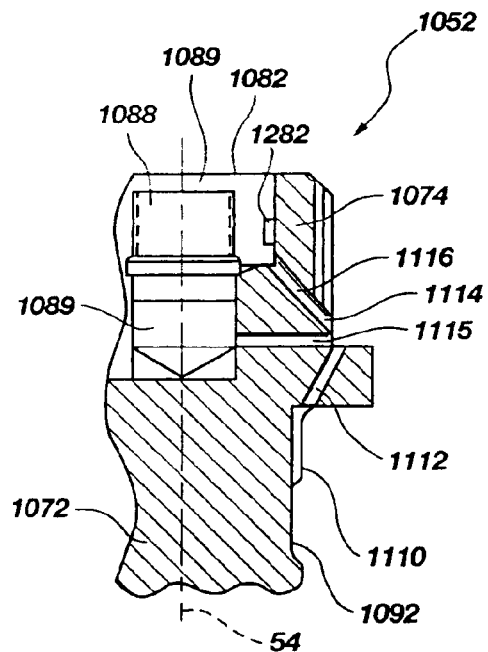
FIG. 15 is an axial cut-away view of the instrumented pin member of FIG. 12, taken along cut-away lines 15—15.

The cavity 1089 itself may be made in known fashion, i.e., by machining. With reference to FIG. 15, an angled notch 2116 is provided in head 1074, extending from notch 1112 as previously described and extending to the cavity 1089 of broach 1088. Notch 1116 is sized so that leads 1110 can pass through it and into cavity 1089. A notch 1115 extends from aperture 1114 into extended portion 1089 of broach 1088. This notch can be useful in gaining access to the cavity 1089, e.g., for placing switching device components, inspecting them, etc.

In accordance with the system aspect of the invention, the system is provided for measuring bending at a joint. The system comprises an instrumented pin member disposed at the joint. The instrumented pin member comprises a pin member body disposed about a pin member axis. The pin member body comprises a bending portion. The pin member further includes a sensing device positioned on the pin member body within the bending portion for sensing an axial strain and an axially orthogonal strain in the bending portion and for outputting a sensor output signal. The system also preferably includes a switching device operatively coupled to the sensing device for switching between an axial sensing mode and an axially orthogonal sensing mode. The system according to this aspect of the invention also includes a sensor signal output device for communicating the sensor output signal.

In a presently preferred embodiment according to this system aspect, the pin member comprises instrumented pin member 52, pin member 1052, or both, as previously described herein. In the preferred system embodiment, a plurality of such pin members is employed, e.g., as illustrated in FIG. 2 and described with reference to that figure herein above.

The instrumented pin member according to this system embodiment preferably comprises a switching device operatively coupled to the sensing device for switching the sensing device in and out of a bending stress mode. The preferred switching device according to the system embodiment comprises the switching device 280 as described herein above.

The system further includes a data receiving device operatively coupled to the sensor signal output device for receiving the sensor output signal. Preferably, but optionally, the data receiving device comprises a data processor. It also may comprise a data display, a data recorder, a strip chart recorder, or any other device or collection of devices suitable for receiving, storing, processing and/or displaying or presenting the data embodied in the sensor signal. As implemented in the presently preferred embodiments, the data receiving device comprises the components illustrated in FIG. 2, and as described above.

In accordance with another aspect of the invention, a method is provided for measuring bending at a joint. The method includes disposing an instrumented pin member at the joint, wherein the instrumented pin member comprises a pin member body disposed about a pin member axis, and wherein the pin member body comprises a bending portion. The method also comprises sensing a bending strain in the bending portion exclusive of a net axial strain during a bending stress measurement mode and outputting a sensor measurement signal. The method further includes communicating the sensor measurement signal to a data receiving device.

The aforementioned disposition of the instrumented pin member preferably comprises disposing a plurality of the instrumented pin members at the joint so that the instrumented pin members are substantially equally spaced about the joint. The sensing preferably includes switching in and out of the bending stress measurement mode.

Although not necessarily limited to applications involving the presently preferred system and embodiments disclosed herein above, a preferred version of the method according to this aspect of the invention will be described and illustrated with reference to them. With reference to FIG. 2, the presently preferred implementation of the method includes disposing a plurality of pin members 52, or pin members 1052, about joint 36 in a uniform and symmetric pattern. For ease of description, it will be assumed below that pin members 52 are used, although this is not limiting. Each of pin members 52 is preloaded by torquing it down a predetermined amount in known fashion and according to the specifications for like noninstrumented pin members, e.g., pin members 46. Each pin member is given a predetermined orientation, which serves as a reference point or calibration point to determine any later rotation of the pin member. The pin members 52 then are coupled using connectors 130 to control box 55, preamplifier 56, processor 60, and the other components of the system 50.

Pin members 52 then are calibrated by adjusting the processor to set the axial and bending stresses at preload and the directions of rotation or bending to be zero under the preload conditions. The specific manner in which this is done will depend upon the specific processor and other equipment that comprises system 50, but will be readily understood by those of ordinary skill in the art.

Assuming the alternating axial and bending stress measurement modes are desired, control box 55 is switched to this setting. The vessel or joint to which system 50 is attached, for example, joint 36 of rocket motor 30, is then actuated, or placed in an operational mode, during which axial and bending stresses are placed on joint 36. As this occurs, switching signal source 288 provides a periodic square wave to switching circuitry 282, which causes the switching device 280 to alternate between the axial stress measurement configuration and the bending stress measurement configuration. As this is done, a periodic sensor measurement signal is created at the output of bridges 150 and 250 and is communicated via leads 100 to preamp 56 and processor 60. The sensor measurement signal is segregated into an axial stress component and a bending stress component, the latter of which comprises x axis and y axis bending information.

Once the sensor measurement signal is obtained from the sensors and from the bridges 150 and 250 in the bending stress measurement configuration and mode, the bending moments can be determined as follows, preferably in processor 60 or its equivalent. The root sum square of the outputs from bridges 150 and 250 yields the magnitude (lbf*ft) of bending moment in the pin member. The arctangent (degrees) of the quotient of the outputs from these bridges in bending mode yields the direction of bending moment (i.e., the orientation of the plane containing the bending moment) e.g., in degrees counterclockwise from the positive x axis strain gage grouping (axial-circumferential half bridge pair, BX1).

It may be preferred in some applications to include fillers, adhesives, coatings and/or the like to secure and protect the components. In the presently preferred embodiments, for example, fillers such as M-BOND GA2 and adhesives such as those identified herein above are used to encase the electrical components, secure wiring, etc.

The invention, as noted, is not necessarily limited to the specific embodiments and illustrations shown and described here. The description above in terms of a rectilinear coordinate system (x, y, z), for example, has been used merely to better illustrate the preferred embodiments and the related principles of the invention. It, of course, will be understood and appreciated by persons skilled in the art that other coordinate systems also could be used, and that translations of such coordinate systems to and from a rectilinear coordinate system are possible. Instead of x and y sensors as described above, for example, the sensing device may be configured to operate in a radial or polar coordinate system. Embodiments of the invention in that case would operate in the same manner as herein described, although a translation of coordinate systems from one system to the other likely would be required. Such coordinate system translations are well known in the art.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. An instrumented pin member, comprising:
a pin member body disposed about a pin member axis, the pin member body comprising a shank including a shank perimeter lying in a plane orthogonal to the pin member axis and a bending portion;
a sensing device positioned at the pin member body within the bending portion for sensing a bending strain in the bending portion exclusive of a net axial strain, and for outputting a sensor measurement signal representative of the bending strain, the sensing device comprising:

first and second x axis sensor elements configured for measuring the bending strain along an x axis, each of the first and second x axis sensor elements comprising a tangential sensor for sensing strain in a direction tangential to the shank perimeter; and first and second y axis sensor elements configured for measuring the bending strain along a y axis; and a sensor measurement signal output device for outputting the sensor measurement signal from the sensing device.

2. The instrumented pin member as recited in claim 1, wherein the sensing device senses components of the bending strain in the bending portion along an x axis and a y axis, the x axis and the y axis being orthogonal to the pin member axis and to each other.

3. The instrumented pin member as recited in claim 1, wherein the pin member body comprises a bolt.

4. The instrumented pin member as recited in claim 1, wherein the pin member body has a cylindrical shape about the pin member axis.

5. The instrumented pin member as recited in claim 1, wherein:

the pin member body comprises a head; and
the bending portion is adjacent to the head.

6. The instrumented pin member as recited in claim 1, wherein each of the first and second x axis sensor elements further comprises an axial sensor for sensing strain in a pin member axial direction corresponding to the pin member axis.

7. The instrumented pin member as recited in claim 6, wherein the sensing device further comprises:

an x axis bridge having a left side and a right side, the left x axis bridge side comprising first and second positions and the right x axis bridge side comprising first and second positions;

the first position of the left x axis bridge side and the first position of the right x axis bridge side being in a first aligned x axis configuration; and the second position of the left x axis bridge side and the second position of the right x axis bridge side being in a second aligned x axis configuration, the axial sensors of the first and second x axis sensor elements being in one of the first aligned x axis configuration and the second aligned x axis configuration.

8. The instrumented pin member as recited in claim 6, wherein the sensing device further comprises:

an x axis bridge having a left side and a right side, the left x axis bridge side comprising first and second positions and the right x axis bridge side comprising first and second positions;

the first position of the left x axis bridge side and the first position of the right x axis bridge side being in a first aligned x axis configuration; and the second position of the left x axis bridge side and the second position of the right x axis bridge side being in a second aligned x axis configuration; and an axial stress measurement configuration and a bending stress measurement configuration, the sensing device being in the bending stress measurement mode when the axial sensors of the first and second x axis sensor elements are in one of the first aligned x axis configuration and the second aligned x axis configuration.

9. The instrumented pin member as recited in claim 8, wherein the sensing device is in the axial stress measurement configuration when the axial sensors of the first and second x axis sensor elements are not in one of the first aligned x axis configuration and the second aligned x axis configuration.

10. The instrumented pin member as recited in claim 1, wherein each of the first and second y axis sensor elements comprises an axial sensor for sensing strain in a pin member axial direction corresponding to the pin member axis.

11. The instrumented pin member as recited in claim 10, wherein the sensing device comprises:

a y axis bridge having a left side and a right side, the left y axis bridge side comprising first and second positions and the right y axis bridge side comprising first and second positions;

the first position of the left y axis bridge side and the first position of the right y axis bridge side being in a first aligned y axis configuration; and the second position of the left y axis bridge side and the second position of the right y axis bridge side being in a second aligned y axis configuration;

the axial sensors of the first and second y axis sensor elements being in one of the first aligned y axis configuration and the second aligned y axis configuration.

12. The instrumented pin member as recited in claim 11, wherein the sensing device further comprises:

an axial stress measurement configuration and a bending stress measurement configuration, the sensing device being in the bending stress measurement configuration when the axial sensors of the first and second y axis sensor elements are in one of the first aligned y axis configuration and the second aligned y axis configuration.

13. The instrumented pin member as recited in claim 12, wherein the sensing device is in the axial stress measurement configuration when the axial sensors of the first and second y axis sensor elements are not in one of the first aligned y axis configuration and the second aligned y axis configuration.

14. The instrumented pin member as recited in claim 1, wherein each of the first and second y axis sensor elements comprises a tangential sensor for sensing strain in a direction tangential to the shank perimeter.

15. The instrumented pin member as recited in claim 14, wherein the sensing device further comprises:

a y axis bridge having a left side and a right side, the left y axis bridge side comprising first and second positions and the right y axis bridge side comprising first and second positions;

the first position of the left y axis bridge side and the first position of the right y axis bridge side being in a first aligned y axis configuration; and the second position of the left y axis bridge side and the second position of the right y axis bridge side being in a second aligned y axis configuration;

the tangential sensors of the first and second y axis sensor elements being in one of the first aligned y axis configuration and the second aligned y axis configuration.

16. The instrumented pin member as recited in claim 15, wherein the sensing device further comprises:

an axial stress measurement configuration and a bending stress measurement configuration, the sensing device being in the bending stress measurement configuration when the axial sensors of the first and second y axis sensor elements are in one of the first aligned y axis configuration and the second aligned y axis configuration.

17. The instrumented pin member as recited in claim 16, wherein the sensing device is in the axial stress measurement configuration when the axial sensors of the first and second y axis sensor elements are not in one of the first aligned y axis configuration and the second aligned y axis configuration.

18. The instrumented pin member as recited in claim 1, wherein:
   each of the first and second x axis sensor elements and each of the first and second y axis sensor elements comprises an axial sensor for sensing strain in a pin member axial direction corresponding to the pin member axis; and
   each of the first and second y axis sensor elements comprises a tangential sensor for sensing strain in a direction tangential to the shank perimeter.

19. The instrumented pin member as recited in claim 18, wherein the sensing device comprises:
   an x axis bridge having a left side and a right side, the left x axis bridge side comprising first and second positions and the right x axis bridge side comprising first and second positions;
   the first position of the left x axis bridge side and the first position of the right x axis bridge side being in a first aligned x axis configuration; and
   the second position of the left x axis bridge side and the second position of the right x axis bridge side being in a second aligned x axis configuration; and
   an axial stress measurement configuration and a bending stress measurement configuration, the sensing device being in the bending stress measurement configuration when the tangential sensors of the first and second x axis sensor elements are in one of the first aligned x axis configuration and the second aligned x axis configuration.

20. The instrumented pin member as recited in claim 19, wherein the sensing device is in the axial stress measurement configuration when the tangential sensors of the first and second x axis sensor elements are not in one of the first aligned x axis configuration and the second aligned x axis configuration.

21. The instrumented pin member as recited in claim 18, wherein the sensing device further comprises:
   an x axis bridge having a left side and a right side, the left x axis bridge side comprising first and second positions and the right x axis bridge side comprising first and second positions;
   the first position of the left x axis bridge side and the first position of the right x axis bridge side being in a first aligned x axis configuration; and
   the second position of the left x axis bridge side and the second position of the right x axis bridge side being in a second aligned x axis configuration;
   the axial sensors of the first and second x axis sensor elements being in one of the first aligned x axis configuration and the second aligned x axis configuration, and the tangential sensors of the first and second x axis sensor elements being in the other of the first aligned x axis configuration and the second aligned x axis configuration; and
   a y axis bridge having a left side and a right side, the left y axis bridge side comprising first and second positions and the right y axis bridge side comprising first and second positions;
   the first position of the left y axis bridge side and the first position of the right y axis bridge side being in a first aligned y axis configuration; and
   the second position of the left y axis bridge side and the second position of the right y axis bridge side being in a second aligned y axis configuration;
   the axial sensors of the first and second y axis sensor elements being in one of the first aligned y axis configuration and the second aligned y axis configuration, and the tangential sensors of the first and second y axis sensor elements being in the other of the first aligned y axis configuration and the second aligned y axis configuration.

22. The instrumented pin member as recited in claim 1, wherein: the sensing device comprises:
   an x axis bridge having a left side and a right side, the left x axis bridge side comprising first and second positions and the right x axis bridge side comprising first and second positions;
   the first position of the left x axis bridge side and the first position of the right x axis bridge side being in a first aligned x axis configuration; and
   the second position of the left x axis bridge side and the second position of the right x axis bridge side being in a second aligned x axis configuration;
   the tangential sensors of the first and second x axis sensor elements being in one of the first aligned x axis configuration and the second aligned x axis configuration.

23. The instrumented pin member as recited in claim 1, wherein the sensing device further comprises a bridge assembly having an axial stress measurement configuration and a bending stress measurement configuration.

24. An instrumented pin member, comprising:
   a pin member body disposed about a pin member axis, the pin member body comprising a bending portion;
   a sensing device positioned at the pin member body within the bending portion for sensing a bending strain in the bending portion exclusive of a net axial strain, and for outputting a sensor measurement signal representative of the bending strain;
   a sensor measurement signal output device for outputting the sensor measurement signal from the sensing device; and
   a switching device operatively coupled to the sensing device for switching between an axial stress measurement configuration and a bending stress measurement configuration.

25. The instrumented pin member as recited in claim 24, wherein the switching device comprises a solid state switching circuit.

26. The instrumented pin member as recited in claim 24, wherein:
   the pin member comprises a head; and
   the switching device is positioned at the pin member head.

27. The instrumented pin member as recited in claim 26, wherein:
   the pin member head includes an external surface and a notch disposed in the external surface; and
   the switching device is mounted to the external surface.

28. The instrumented pin member as recited in claim 24, wherein:
   the pin member comprises a head including a head cavity; and
   the switching device is positioned at the pin member head cavity.

29. The instrumented pin member as recited in claim 24, wherein the switching device comprises a periodic switching signal source for providing a periodic switching signal.

30. The instrumented pin member as recited in claim 24, wherein:

the sensing device comprises a pair of bridges, each having an axial stress measurement configuration and a bending stress measurement configuration; and the switching device comprises a switch operatively coupled to the pair of bridges for switching the pair of bridges between the axial stress measurement configuration and the bending stress measurement configuration.

31. The instrumented pin member as recited in claim 30, wherein the switching device switches the pair of bridges to the bending stress measurement configuration substantially simultaneously.

32. An instrumented pin member, comprising:

a pin member body disposed about a pin member axis, the pin member body comprising a bending portion;

a sensing device positioned on the pin member body within the bending portion for sensing a bending stress in the bending portion during a bending stress measurement mode and for outputting a sensor measurement signal;

a switching device operatively coupled to the sensing device for switching the sensing device in and out of the bending stress measurement mode; and a sensor signal output device for communicating the sensor measurement signal.

33. A method for measuring bending at a joint, the method comprising:

disposing an instrumented pin member at the joint, the instrumented pin member comprising a pin member body disposed about a pin member axis, the pin member body comprising a bending portion;

sensing a bending strain in the bending portion exclusive of a net axial strain during a bending stress measurement mode and outputting a sensor measurement signal wherein the sensing includes switching in and out of the bending stress measurement mode; and communicating the sensor measurement signal to a data receiving device.

34. The method as recited in claim 33, wherein the disposing of the instrumented pin member comprises disposing a plurality of instrumented pin members at the joint so that the instrumented pin members are substantially equally spaced about the joint.

* * * * *

UNITED STATES PATENT AND TRADEMARK OFFICE
CERTIFICATE OF CORRECTION

PATENT NO. : 6,951,137 B2
APPLICATION NO. : 09/897003
DATED : October 4, 2005
INVENTOR(S) : Douglas E. Smith et al.

Figure 12:
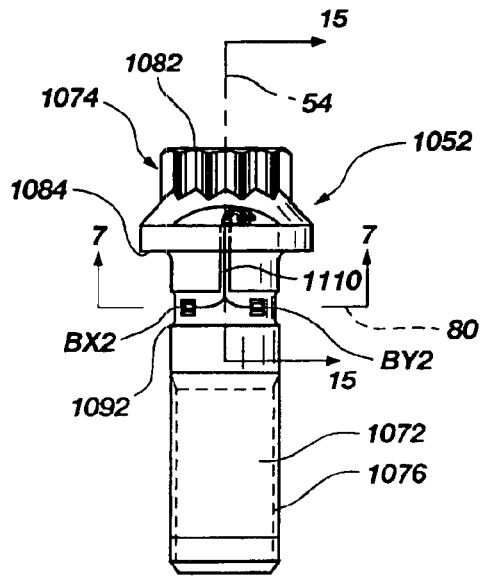
FIG. 12 is a side view of an instrumented pin member according to a second preferred embodiment of the invention.
Figure 13:
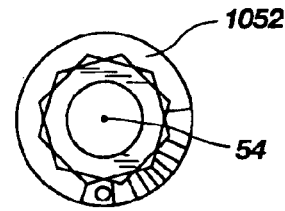
FIG. 13 is a top axial view of the instrumented pin member of FIG. 12.

It is certified that error appears in the above-identified patent and that said Letters Patent is hereby corrected as shown below:

In the drawings:

In FIG. 12, delete reference numerals 1072, 1076, 1082, 1092 and associated lead lines (as shown below)

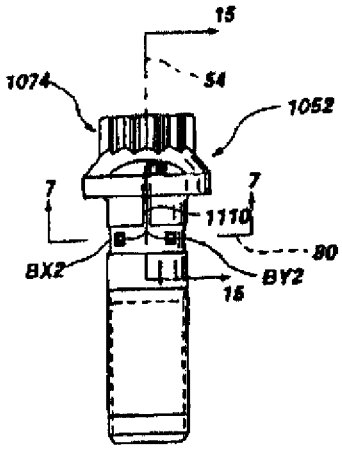

FIG. 12

Figure 14:
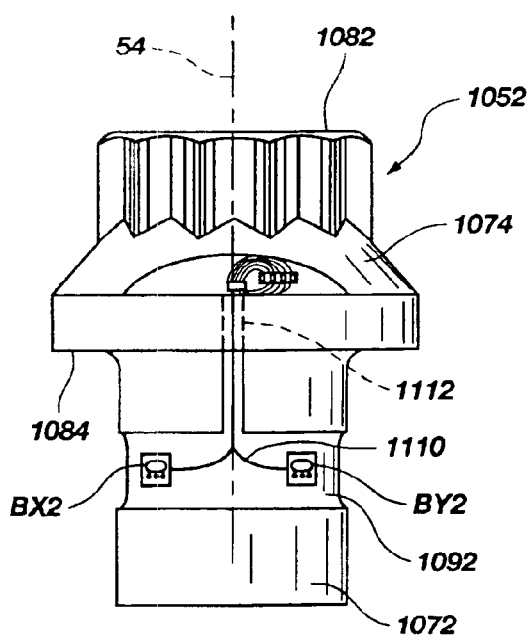
FIG. 14 is an expanded side view of the head and upper shank portion of the instrumented pin member of FIG. 12.

In FIG. 14, delete reference numerals 1072, 1082, 1084, 1092 and associated lead lines (as shown below)

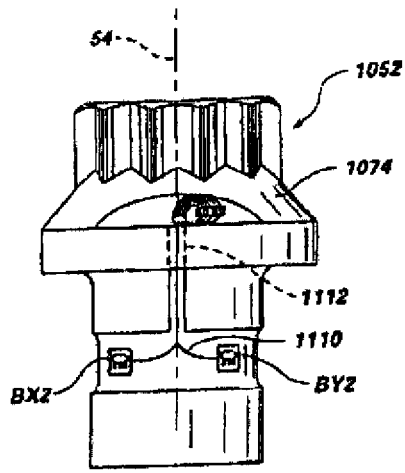

FIG. 14

UNITED STATES PATENT AND TRADEMARK OFFICE
CERTIFICATE OF CORRECTION

| | | |
|---|---|---|
| PATENT NO. | : 6,951,137 B2 | Page 2 of 2 |
| APPLICATION NO. | : 09/897003 | |
| DATED | : October 4, 2005 | |
| INVENTOR(S) | : Douglas E. Smith et al. | |

It is certified that error appears in the above-identified patent and that said Letters Patent is hereby corrected as shown below:

In FIG. 15, delete reference numerals 1072, 1082, 1092 and associated lead lines (as shown below)

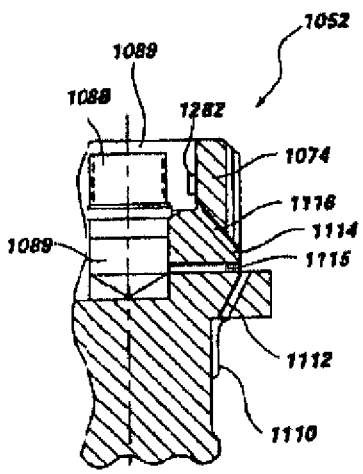

FIG. 15

In the specification:
COLUMN 16, LINE 33, change "2116" to --1116--

Signed and Sealed this

Twenty-first Day of April, 2009

JOHN DOLL
*Acting Director of the United States Patent and Trademark Office*